United States Patent
Lin et al.

(10) Patent No.: US 7,864,548 B2
(45) Date of Patent: Jan. 4, 2011

(54) SYNCHRONOUS RECTIFIER CONTROL DEVICE AND FORWARD SYNCHRONOUS RECTIFIER CIRCUIT

(75) Inventors: Chun-Ming Lin, Hsinchu (TW); Hsin-Yu Pan, Tucheng (TW)

(73) Assignee: Niko Semiconductor Co., Ltd., Taipei (TW)

( * ) Notice: Subject to any disclaimer, the term of this patent is extended or adjusted under 35 U.S.C. 154(b) by 393 days.

(21) Appl. No.: 12/155,860

(22) Filed: Jun. 11, 2008

(65) Prior Publication Data

US 2009/0161396 A1    Jun. 25, 2009

(30) Foreign Application Priority Data

Dec. 24, 2007    (TW) ............................... 96149720 A

(51) Int. Cl.
H02M 3/335      (2006.01)
H02M 7/217      (2006.01)

(52) U.S. Cl. ..................... 363/21.06; 363/127

(58) Field of Classification Search .............. 363/21.02, 363/21.04, 21.05, 21.06, 21.14, 81, 84, 125, 363/127
See application file for complete search history.

(56) References Cited

U.S. PATENT DOCUMENTS

| | | | | |
|---|---|---|---|---|
| 6,888,728 B2 * | 5/2005 | Takagi et al. ................... | 363/17 |
| 7,184,280 B2 * | 2/2007 | Sun et al. ................... | 363/21.02 |
| 7,206,208 B1 * | 4/2007 | Hsu et al. ................ | 363/21.06 |
| 7,764,516 B2 * | 7/2010 | Yang ........................ | 363/21.06 |
| 2004/0136209 A1 * | 7/2004 | Hosokawa et al. ............ | 363/24 |
| 2005/0024896 A1 * | 2/2005 | Man-Ho ................... | 363/21.04 |
| 2008/0002441 A1 * | 1/2008 | Allinder ................... | 363/21.14 |
| 2009/0003019 A1 * | 1/2009 | Yang ........................ | 363/21.06 |

* cited by examiner

*Primary Examiner*—Adolf Berhane
(74) *Attorney, Agent, or Firm*—Rosenberg, Klein & Lee

(57) ABSTRACT

Disclosed are a synchronous rectifier control device and a forward synchronous rectifier circuit. The synchronous rectifier control device is coupled with the secondary side of the forward synchronous rectifier circuit, comprising a condition detecting unit, a reference time circuit and a synchronous signal generator. The condition detecting unit receives at least one reference signal and a detecting signal in response to the condition of the secondary side of the forward synchronous rectifier circuit, and accordingly generates a first synchronous control signal. The reference time circuit is coupled with the condition detecting unit, and generates a reference time signal in response to the first synchronous control signal. The synchronous signal generator generates a second synchronous control signal in response to the first synchronous control signal and the reference time signal.

14 Claims, 6 Drawing Sheets

SYNCHRONOUS RECTIFIER CONTROL DEVICE AND FORWARD SYNCHRONOUS RECTIFIER CIRCUIT

BACKGROUND OF THE INVENTION

1. Field of the Invention

The present invention relates to a synchronous rectifier control device and a forward synchronous rectifier circuit; in particular, to a synchronous rectifier control device and a forward synchronous rectifier circuit for determining continuous current mode or discontinuous current mode based on duty cycle of input signal.

2. Description of Related Art

FIG. 1 illustrates a diagram of a conventional forward circuit. The forward circuit is provided with a transformer T1, and its primary side has an input voltage VIN connected to a pre-stage circuit, a pulse width modulation controller PWM, an input filtering capacitor C1, an initiating resistor R1, an initiating capacitor C2, a current detecting resistor R2, a rectifier diode D1 and a transistor switch Q1 controlled by the pulse width modulation controller PWM. On the secondary side of transformer T1 are two output rectifier diodes D2, D3, an energy storage inductor L, an output filtering capacitor C3 and a voltage detector 10 formed by resistors R3 and R4.

In the above-mentioned forward converter circuit, when initially started, the input voltage VIN begins to charge initiating capacitor C2 through initiating resistor R1. When the potential in initiating capacitor C2 has been charged to a level high enough for initiating pulse width modulation controller PWM, pulse width modulation controller PWM will start to operate. Pulse width modulation controller PWM, based on the detecting signal for output voltage VO from voltage detector 10 and the detecting signal for the input current from current detecting resistor R2, adjusts the duty cycle of a control signal, i.e. adjusting the ratio of turning on periods and turning off periods in transistor switch Q1. When output voltage VO is below a predetermined voltage, the duty cycle of the control signal will be increased; contrarily, when output voltage VO is above the predetermined voltage, the duty cycle of the control signal will be reduced, thereby a stable output voltage VO can be output.

When transistor switch Q1 is turned on, input voltage VIN provides energy through transformer T1, stores energy to initiating capacitor C2 through rectifier diode D1, and stores energy to energy storage inductor L and output filtering capacitor C3 through rectifier diode D2. When transistor switch Q1 is turned off, initiating capacitor C2 discharges energy to enable pulse width modulation controller PWM to continue to operate, while energy storage inductor L discharges energy to output filtering capacitor C3 via the rectifier diode D3.

However, since there are forward voltage drop on rectifier diodes D2, D3 when current flows through, power loss thus appears. As a result, it is known, in prior art, that the rectifier diodes may be replaced with transistor switches, so as to reduce power loss therein.

Referring now to FIG. 2, wherein a diagram of a conventional forward synchronous rectifier circuit is shown, in which transistor switches Q2, Q3 are used to replace rectifier diodes D2, D3 in FIG. 1. A synchronous rectifier controller Con controls the turning-on and turning-off periods of transistor switches Q2, Q3 based on the secondary side voltage and deadtime setting signals S1, S2.

FIG. 3 illustrates a signal timing diagram of a conventional forward synchronous rectifier circuit operating in continuous current mode. In conjunction with FIGS. 2 and 3 for references, the voltages on two sides of transformer T1 are respectively V1, V2, and, when synchronous rectifier controller Con detects that voltage V1 in transformer T1 increases, a first synchronous signal is generated for controlling transistor switch Q2 to become conducting. At this moment, the current in transformer T1 flows from voltage V1 side to the other side of the transformer through energy storage inductor L, output filtering capacitor C3 and transistor switch Q2. Synchronous rectifier controller Con, based on dead zone setting signal S1, makes transistor switch Q2 to be cutoff in advance for a deadtime DT1 before conducting time Ton. When transistor switch Q2 is cutoff and after elapsing of deadtime DT1, synchronous rectifier controller Con generated a second synchronous signal to control transistor switch Q3 to be conducting, and now the energy stored on energy storage inductor L can output via the path formed by output filtering capacitor C3 and transistor switch Q3. Synchronous rectifier controller Con, based on deadtime setting signal S2, makes transistor switch Q3 to be cutoff in advance for a deadtime DT2 before cutoff time Toff. Deadtimes DT1, DT2 are set in order to avoid transistor switches Q2, Q3 from conducting simultaneously. Within deadtimes DT1, DT2, current of the secondary side could flow through the body diodes of transistor switches Q2, Q3.

Whereas, the aforementioned approach to achieve deadtime setting by means of cutting off the transistor switches in advance for a predetermined period may easily cause a situation of reverse current in discontinuous current mode. Referring to FIG. 4, wherein a signal timing diagram of a conventional forward synchronous rectifier circuit operating in discontinuous current mode is shown. While operating in discontinuous current mode, the energy storage inductor L may have already discharged all energy stored, before the pulse width modulation controller PWM on the primary side controls transistor switch Q1 to conduct in the next period, hence output filtering capacitor C3 would start to output energy in reverse direction to energy storage inductor L, as shown in FIG. 4, clearly indicated with area A that has less than 0 volts appears in voltage V2. The occurrence of reverse current may cause not only instability in output voltage VO, but also consume energy.

SUMMARY OF THE INVENTION

In view of the disadvantage that reverse current may occur in discontinuous current mode, the synchronous rectifier control device according to the present invention can detect the condition of the forward synchronous rectifier circuit, and stop switching of the synchronous rectifier transistor when the forward synchronous rectifier circuit enters into discontinuous current mode, so as to avoid reverse current problem.

To achieve the above-mentioned objective, the present invention provides a synchronous rectifier control device which is coupled with a secondary side of a forward synchronous rectifier circuit, wherein the synchronous rectifier control device includes a condition detecting unit, a reference time circuit and a synchronous signal generator. The said condition detecting unit receives a detecting signal representing the condition on the secondary side of the forward synchronous rectifier circuit; as well as at least one reference signal, in which a first synchronous control signal is generated accordingly. The above-mentioned reference time circuit is coupled with the condition detecting unit, and generates a reference time signal based on the first synchronous control signal. The above-mentioned synchronous signal generator generates a second synchronous control signal according to the first synchronous control signal and the reference time signal. Herein, when-the time period of the first synchronous control signal is shorter than the time period of the reference time signal, the synchronous signal generator stops generating the second synchronous control signal.

The present invention also provides a forward synchronous rectifier circuit, which includes a converting unit, a first switch, a pulse width modulation controller, a synchronous rectifier switch unit and a synchronous rectifier controller. The said converting unit has a primary side and a secondary side, in which the primary side is coupled with an input voltage, converting the power of the input voltage into an output voltage onto the secondary side output. The above-mentioned first switch is coupled with the primary side of the converting unit. The said pulse width modulation controller controls the switching of the first switch based on the detecting signal of the output voltage. The above-mentioned synchronous rectifier switch unit has a second switch and a third switch, coupled with the secondary side of the converting unit to rectify the output voltage. The said synchronous rectifier controller is coupled with the secondary side of the converting unit, and generates a first synchronous control signal and a second synchronous control signal based on the condition of the secondary side, so as to respectively control the switching of the second switch and the third switch; wherein, when the time period of the first synchronous control signal is shorter than a predetermined time period, it stops generating the second synchronous control signal.

DETAILED DESCRIPTION OF THE PREFERRED EMBODIMENTS

The present invention employs a reference time circuit to determine whether the conducting time period on the primary side of a forward synchronous rectifier circuit exceeds a predetermined time period; if no, then it is determined to be in a discontinuous current mode, and the conducting of the transistor Q3 for synchronous rectification on the secondary side would stop, so as to avoid occurrence of reverse current problem.

Figure 1:
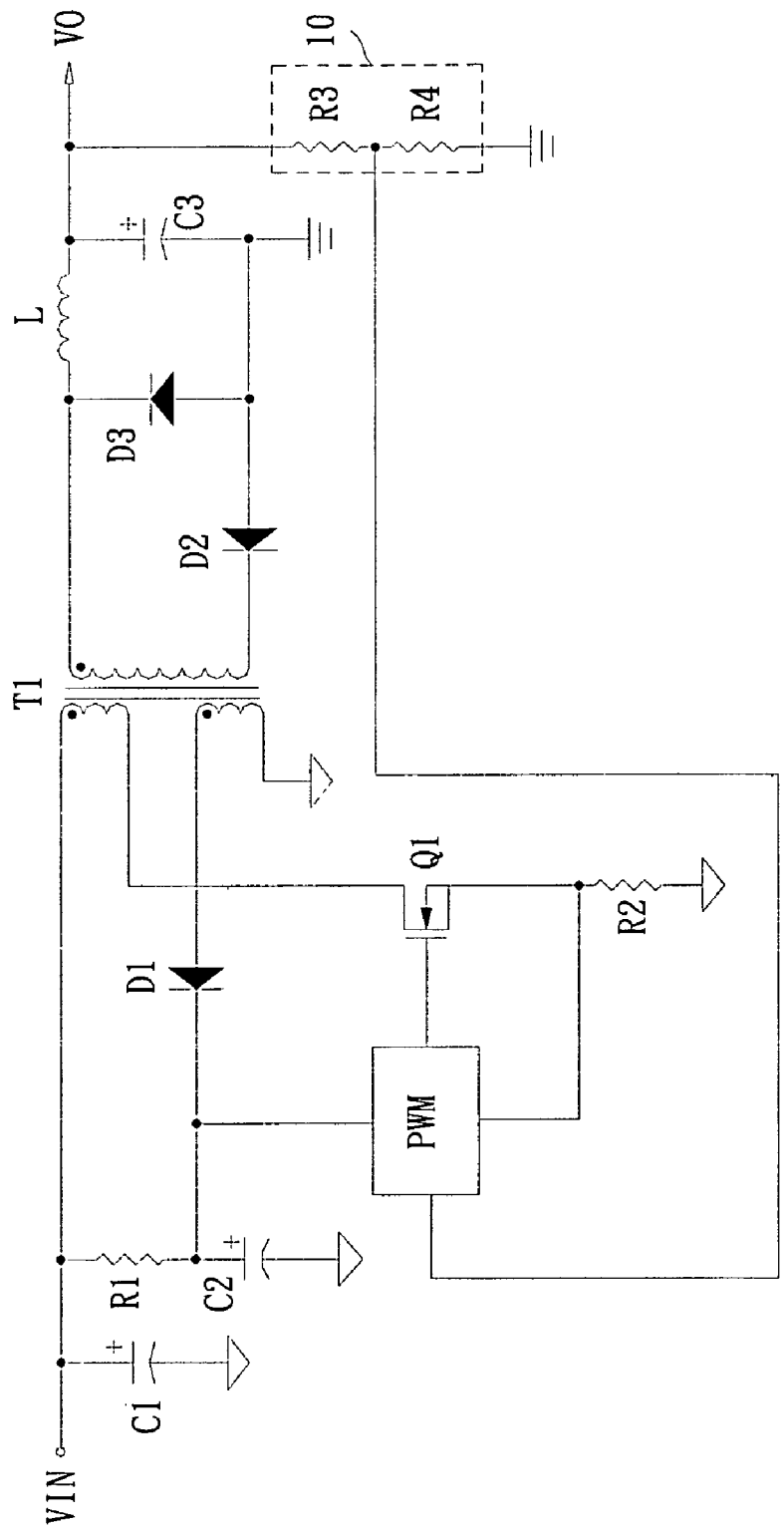
FIG. 1 shows a diagram of a conventional forward circuit.
Figure 2:
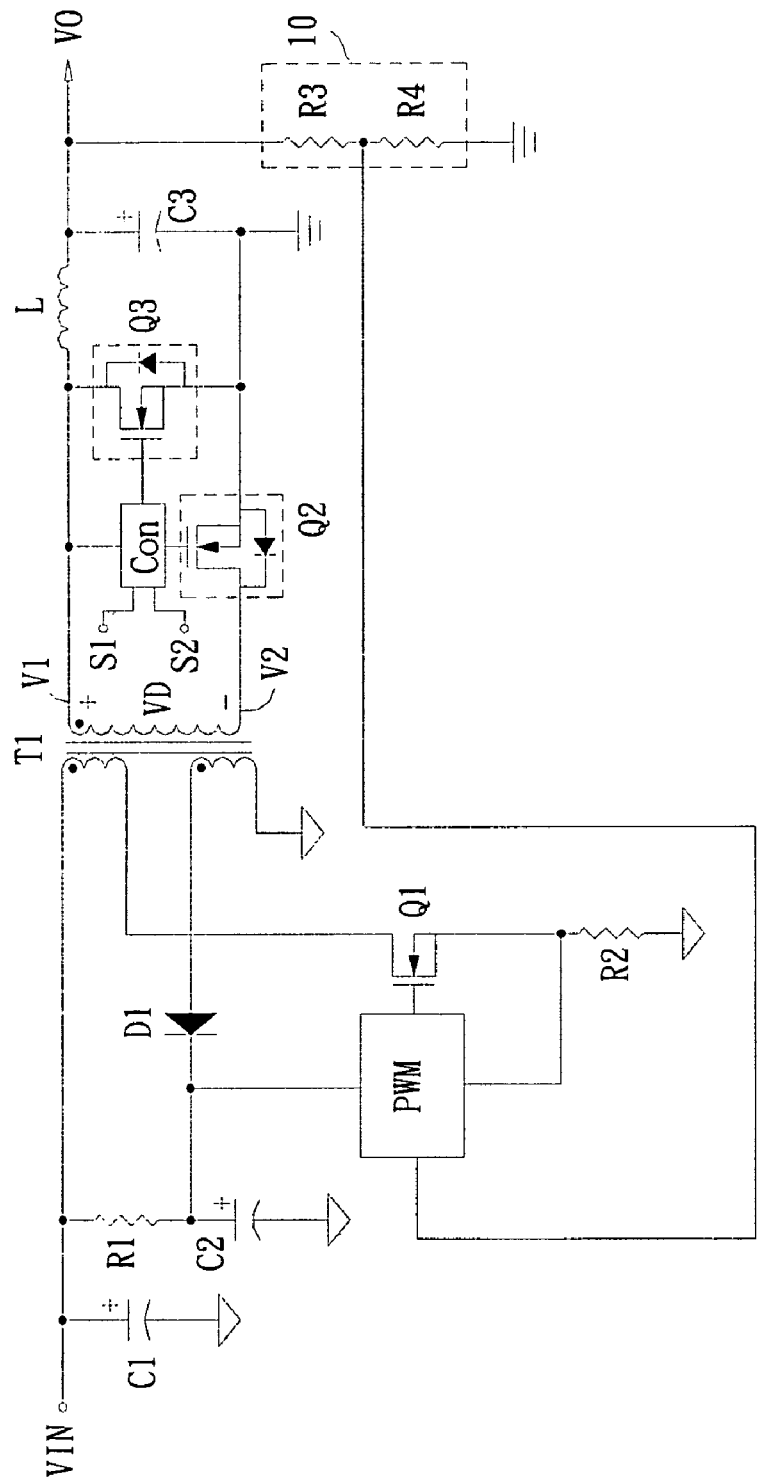
FIG. 2 shows a diagram of a conventional forward synchronous rectifier circuit.
Figure 3:
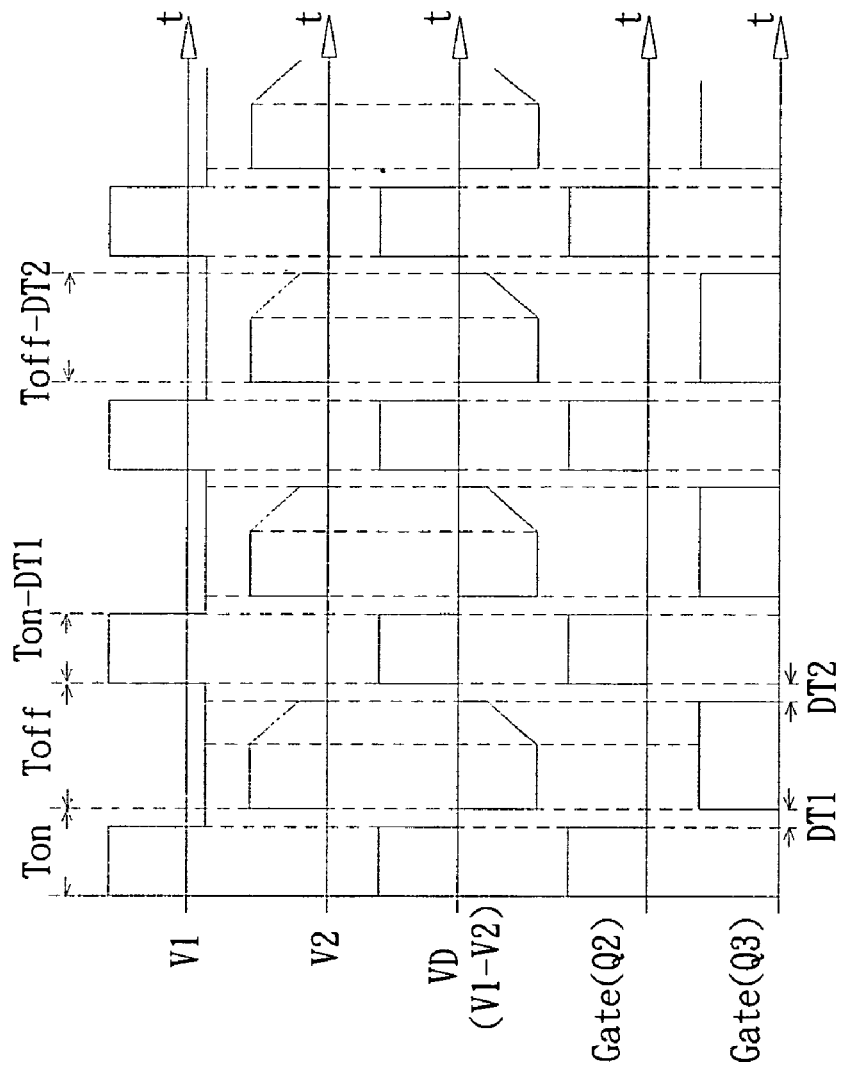
FIG. 3 shows a signal timing diagram of a conventional forward synchronous rectifier circuit operating in continuous current mode.
Figure 4:
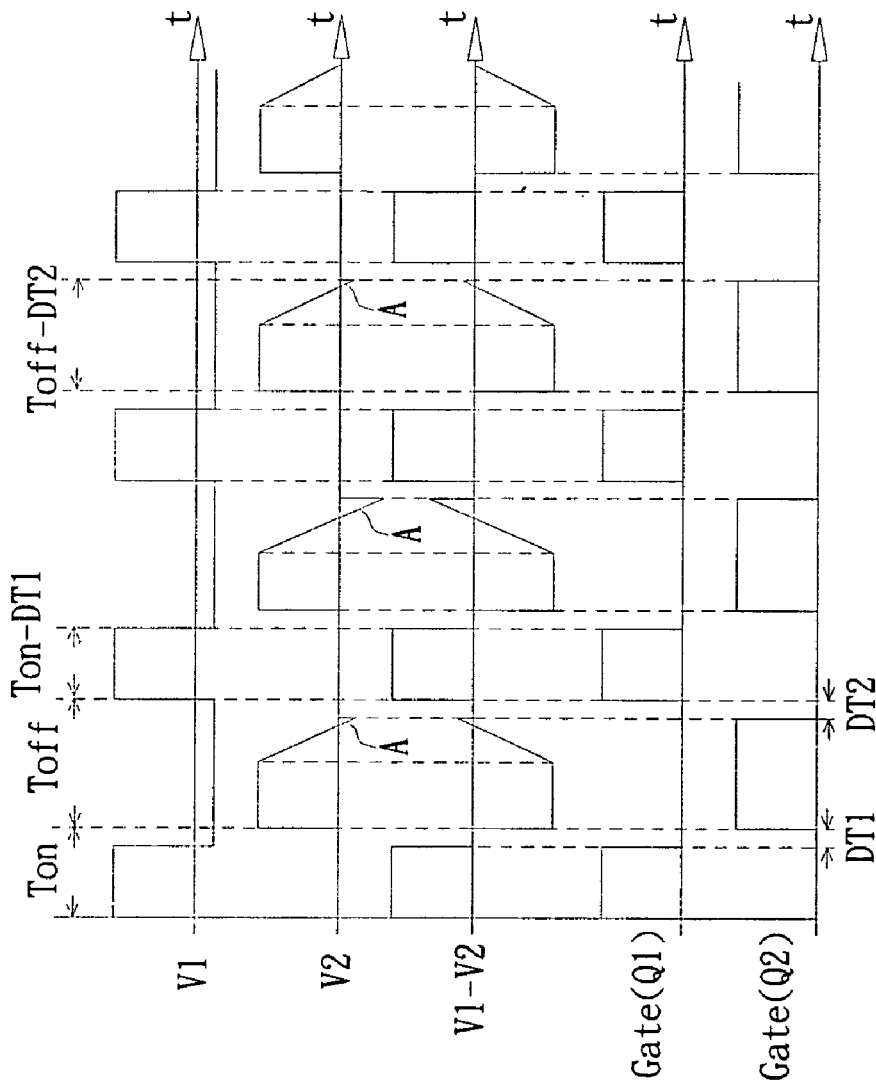
FIG. 4 shows a signal timing diagram of a conventional forward synchronous rectifier circuit operating in discontinuous current mode.
Figure 5:
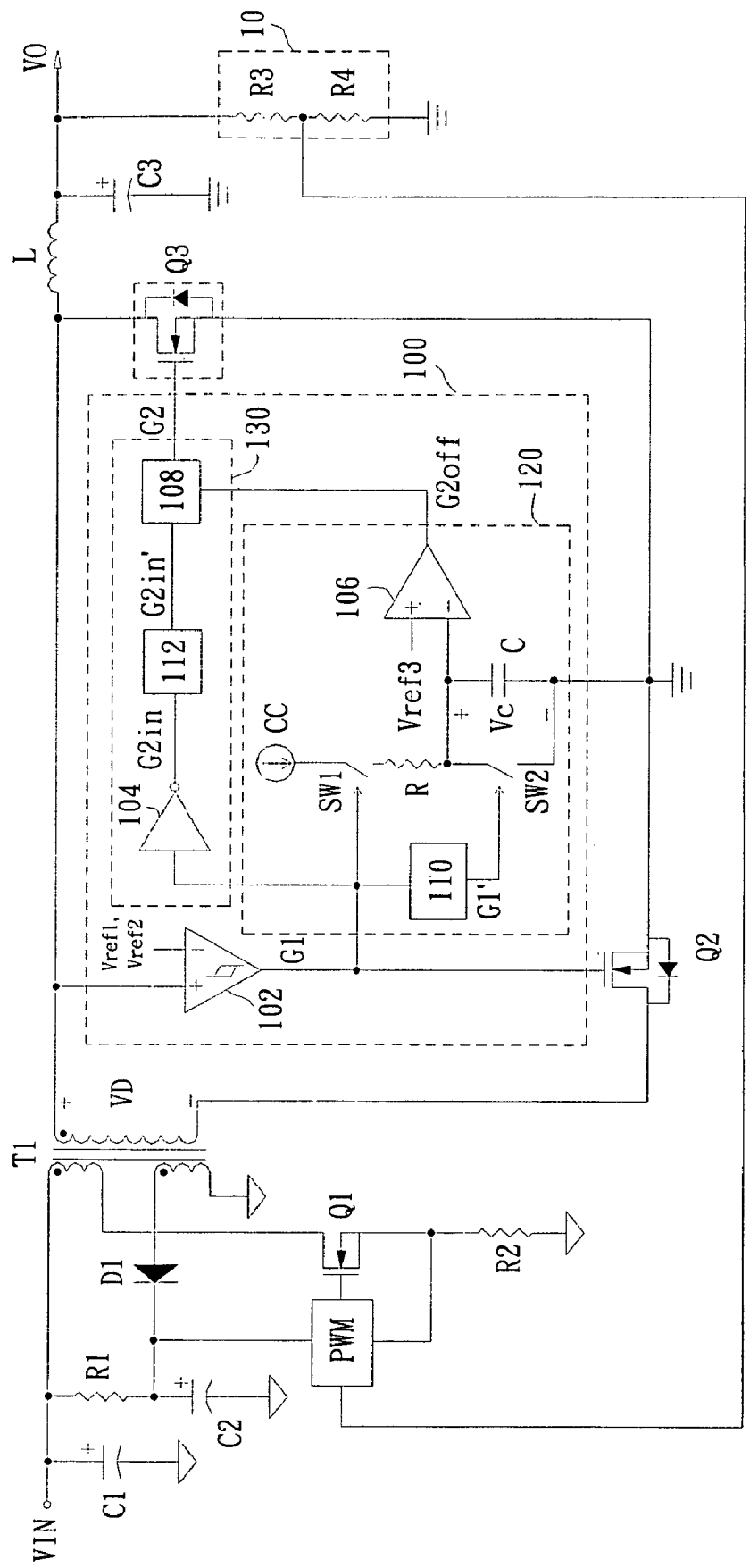
FIG. 5 shows a diagram of forward synchronous rectifier circuit according to a preferred embodiment of the present invention.

Refer to FIG. 5, wherein a diagram of forward synchronous rectifier circuit according to a preferred embodiment of the present invention is shown. The depicted forward synchronous rectifier circuit includes an input voltage VIN, a pulse width modulation controller PWM, an input filtering capacitor C1, an initiating resistor R1, an initiating capacitor C2, a current detecting resistor R2, a rectifier diode D1, transistor switches Q1, Q2 and Q3, a transformer T1, an energy storage inductor L, an output filtering capacitor C3, a voltage detector 10 and a synchronous rectifier control device 100, wherein the input filtering capacitor C1, initiating resistor R1, initiating capacitor C2, rectifier diode D1, transformer T1, energy storage inductor L and output filtering capacitor C3 form a converting unit, transistor switches Q2 and Q3 form a synchronous rectifier switch unit. Input voltage VIN is coupled with the primary side of transformer T1 for providing power. Input filtering capacitor C1 is coupled with input voltage VIN for filtering input noise. Initiating resistor R1 and initiating capacitor C2 are coupled in series with input voltage VIN, so as to, upon the initiation of the circuit, the potential across initiating capacitor C2 is sufficiently charged to initiate the operation of pulse width modulation controller PWM.

Voltage detector 10 consists of resistors R3, R4, coupled with the secondary side of transformer T1, so as to generate a voltage detecting signal based on the output voltage VO. Pulse width modulation controller PWM adjusts the duty cycle of the control signal which is based on the voltage detecting signal as well as the output current detecting signal generated by current detecting resistor R2, all in order to tune the ratio of conducting and cutoff time in transistor switch Q1. Transistor switch Q1 is coupled with the primary side of transformer T1, controlling the power level transformed by transformer T1 through the switching of conducting and cut-off condition. When transistor switch Q1 is conducted, input voltage VIN provides energy via transformer T1, stores energy to initiating capacitor C2 through rectifier diode D1; while transistor switch Q1 is cutoff, initiating capacitor C2 discharges energy to enable pulse width modulation controller PWM to continue to operate.

Synchronous rectifier control device 100 is coupled with the secondary side of transformer T1, and detects a voltage VD on the secondary side of transformer T1, so as to output a synchronous rectifier signal to control the conductance and cutoff of transistor switches Q1 and Q2 on the secondary side, such that transformer T1 stores the transformed power onto energy storage inductor L and output filtering capacitor C3, so as to generate an output voltage VO. The synchronous rectifier control device 100 includes a condition detecting unit 102, a reference time circuit 120 and a synchronous signal generator 130. Condition detecting unit 102 receives a detecting signal VD representing the condition on the secondary side of the forward synchronous rectifier circuit as well as at least one reference signal, and generates a first synchronous control signal G1 accordingly. Reference time circuit 120 is coupled with condition detecting unit 102, and generates a reference time signal G2off based on first synchronous control signal G1. Synchronous signal generator 130 generates a second synchronous control signal G2 according to first synchronous control signal G1 and reference time signal G2off. When the time period of first synchronous control signal G1 is shorter than the time period of reference time signal G2off, synchronous signal generator 130 stops generating second synchronous control signal 62. The detailed circuit operations of the synchronous rectifier control device 100 will be described hereunder.

Figure 6:
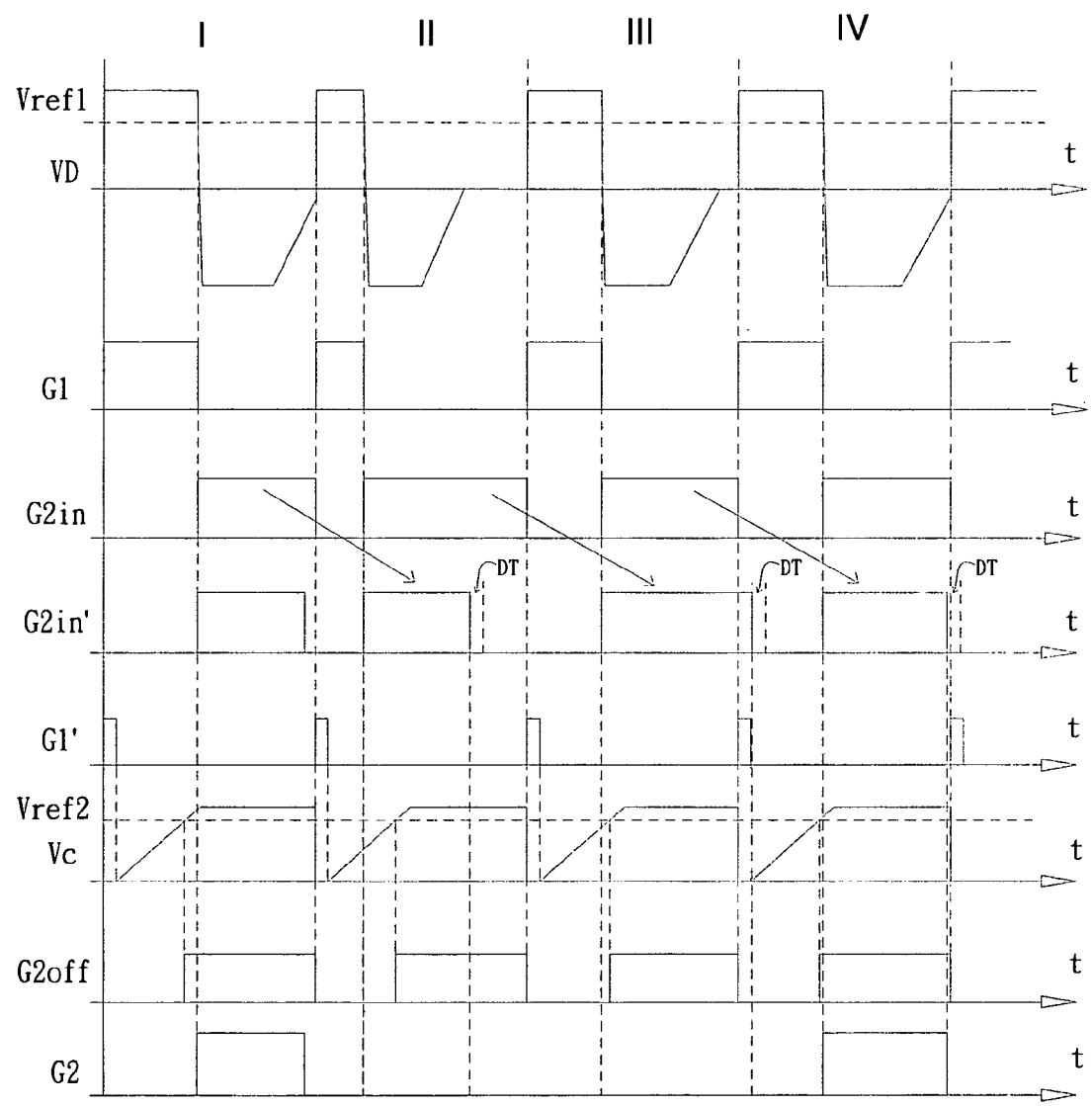
FIG. 6 shows a signal timing diagram of a forward synchronous rectifier circuit according to the present invention.

FIG. 6 shows a signal timing diagram of a forward synchronous rectifier circuit according to the present invention. Referring collectively to FIGS. 5 and 6 for references, condition detecting unit 102 compares secondary side voltage VD, a first reference voltage Vref1, and a second reference voltage Vref2, so as to generate a first synchronous control signal G1. Condition detecting unit 102 may be a comparator for comparing the secondary side voltage VD with a reference voltage; in the present embodiment, a hysteresis comparator, for comparing the secondary side voltage VD, a first reference voltage Vref1, and a second reference voltage Vref2 so as to determine the condition on the secondary side. When secondary side voltage VD arises and exceeds first reference voltage Vref1, first synchronous control signal G1 is HIGH, making transistor switch Q2 conducting; while secondary side voltage VD falls thus down below second reference voltage Vref2, first synchronous control signal G1 is LOW, making transistor switch Q2 cutoff; wherein first reference voltage Vref1 is higher than second reference voltage Vref2. Synchronous signal generator 130 includes an inverter 104, a signal processor 108 and a time period adjuster 112. The inverter 104 is coupled with condition detecting unit 102, and generates an inverted signal G2in according to first synchronous control signal G1. Time adjuster 112 is coupled with inverter 104, and generates an adjusting signal G2in' based on inverted signal G2in, wherein adjusting signal G2in' is shorter than inverted signal G2in by a deadtime time DT, and is provided for transistor switch Q3 switching in the next switching period. For example, the time period of adjusting signal G2in' in second period II is shorter than the time period of inverted signal G2in in first period I by a deadtime time DT, and time period of G2in' in third period III is shorter than the time period of inverted signal G2in in second period II by a deadtime time DT, etc. In the present embodiment, deadtime time is not provided between transistor switch Q2 cutoff and transistor switch Q3 conducting because upon a time lag existing in the signal process delay while the generation of first synchronous control signal G1 and second synchronous control signal G2 by synchronous rectifier control device 100, and so the time lag can be hence used as the deadtime time. Certainly, in the present invention, a deadtime time may be, as conventionally known, provided between transistor switch Q2 cutoff and transistor switch Q3 conducting without being restricted by the embodiment of present invention.

Reference time circuit 120 includes a current source CC, two switches SW1, SW2, a comparator 106, a rising edge trigger 110, a resistor R and a capacitor C. Switch SW1 is switched based on first synchronous control signal G1, conducting as the signal being HIGH, cutoff as being LOW. When switch SW1 is conducted an d switch SW2 is cutoff, capacitor C will start to be charged through resistor R, such that voltage Vc in capacitor C arises gradually, and exceeds a third reference voltage Vref3 after a predetermined time period. The said predetermined time period may be adjusted by means of adjusting the magnitude of capacitor C, so as to match various forward synchronous rectifier circuits. Alternatively, other than the approach of charging capacitor C with a current source, it is also possible to charge capacitor C by a fixed voltage source through a resistor coupling therewith, which is well-known by those skilled in the art. The above-mentioned two approaches may both adjust the duration of the predetermined time period by tuning the magnitude of the capacitance or the resistance. Comparator 106 compares voltage Vc with third reference voltage Vref3 and generates reference time signal G2off as voltage Vc reaches third reference voltage Vref3. When secondary side voltage VD arises and exceeds first reference voltage Vref1 in the next period, first synchronous control signal G1 becomes HIGH, and the rising edge trigger 110 generates a HIGH signal to conduct the switch SW2, enabling capacitor C to discharge, voltage Vc in capacitor C dropping to zero, and then repeating the aforementioned procedure.

The setting of the above-mentioned predetermined time period is based on the critical duty cycle of continuous current mode and discontinuous current mode in the forward synchronous rectifier circuit. Signal processor 108. receives reference time signal G2off and adjusting signal G2in', and when reference time signal G2off has been generated but adjusting signal G2in' has not yet been generated, it means the forward synchronous rectifier circuit is now in the continuous current mode, and signal processor 108 outputs the adjusting signal G2in' as second synchronous rectifier signal G2, so as to control the conductance of transistor switch Q3, as shown at period I and IV in FIG. 6. On the other hand, when adjusting signal G2in' has been generated but reference time signal G2off has not yet been generated, this represents the forward synchronous rectifier circuit is now in the discontinuous current mode; hence, signal processor 108 stops outputting adjusting signal G2in', the second synchronous signal is skipped in this period, transistor switch Q3 maintains its cutoff condition, and the forward synchronous rectifier circuit now discharges energy in energy storage inductor L to output filtering capacitor C3 through the body diode of transistor switch Q3, as shown at period II and III in FIG. 6. Thereby, the possible reverse current when conducting transistor switch Q3 in the discontinuous current mode, as well as the problems of instability in output voltage VO and power consumption or loss, may thus be avoided and solved.

In summary, as described supra, the present invention fully matches the three requirements for patent application: novelty, progression and usability in the art. Although the present invention has been disclosed with the preferred embodiments thereof, those skilled in the art should, however, appreciate that the illustrated embodiments are merely stated to describe the present invention, not to be construed as limiting the scope of the present invention thereto. It is noted that all changes, modifications and alternations equivalent in effect to the aforementioned embodiments should be considered as being encompassed with the scope of the present invention. Therefore, the scope of the present invention required to be protected should be defined and delineated by the claims set out hereunder.

What is claimed is:

1. A synchronous rectifier control device coupled with the secondary side of a forward synchronous rectifier circuit, which includes:
   a condition detecting unit, which receives a detecting signal, representing the condition on the secondary side of the forward synchronous rectifier circuit, and at least one reference signal, and generates a first synchronous control signal accordingly;
   a reference time circuit, which is coupled with the condition detecting unit, and generates a reference time signal based on the first synchronous control signal; and
   a synchronous signal generator, which generates a second synchronous control signal according to the first synchronous control signal and the reference time signal;
   wherein, when the time period of the first synchronous control signal is shorter than the time period of the reference time signal, the synchronous signal generator stops generating the second synchronous control signal.

2. The synchronous rectifier control device according to claim 1, wherein the reference time signal can be adjusted by means of adjusting the time period which is based on a resistance value.

3. The synchronous rectifier control device according to claim 1, wherein the reference time signal can be adjusted by means of adjusting the time period which is based on a capacitance value.

4. The synchronous rectifier control device according to claim 2, wherein the synchronous signal generator includes an inverter and a time period adjuster, in which the inverter generates a inverted signal based on the first synchronous control signal, and the time period adjuster reduces the duration of the inverted signal so as to generate an adjusting signal.

5. The synchronous rectifier control device according to claim 3, wherein the synchronous signal generator includes an inverter and a time period adjuster, in which the inverter generates an inverted signal based on the first synchronous control signal, and the time period adjuster reduces the duration of the inverted signal so as to generate an adjusting signal.

6. The synchronous rectifier control device according to claim 4, wherein the synchronous signal generator further includes a signal processor, in which the signal processor receives the adjusting signal and the reference time signal, and when the time period of the first synchronous control signal is longer than the time period represented by the reference time signal, the signal processor outputs the adjusting signal as the second synchronous control signal, whereas when the time period of the first synchronous control signal is shorter than the time period represented by the reference time signal, the signal processor stops outputting the second synchronous control signal.

7. The synchronous rectifier control device according to claim 5, wherein the synchronous signal generator further includes a signal processor, in which the signal processor receives the adjusting signal and the reference time signal, and when the time period of the first synchronous control signal is longer than the time period represented by the reference time signal, the signal processor outputs the adjusting signal as the second synchronous control signal, whereas when the time period of the first synchronous control signal is shorter than the time period represented by the reference time signal, the signal processor stops outputting the second synchronous control signal.

8. The synchronous rectifier control device according to claim 2, wherein the condition detecting unit is a hysteresis comparator, and receives a first reference voltage, a second reference voltage and the detecting signal, and when the detecting signal is higher than the first reference voltage, the condition detecting unit outputs the first synchronous control signal, and when the detecting signal is lower than the second reference voltage, the condition detecting unit stops outputting the first synchronous control signal, in which the first reference voltage is higher than the second reference voltage.

9. The synchronous rectifier control device according to claim 3, wherein the condition detecting unit is a hysteresis comparator, and receives a first reference voltage, a second reference voltage and the detecting signal, and when the detecting signal is higher than the first reference voltage, the condition detecting unit outputs the first synchronous control signal, and when the detecting signal is lower than the second reference voltage, the condition detecting unit stops outputting the first synchronous control signal, in which the first reference voltage is higher than the second reference voltage.

10. The synchronous rectifier control device according to claim 3, wherein the reference time circuit includes a current source, a first switch, a second switch, a comparator, a rising edge trigger, a resistor and a capacitor, in which the first switch performs switching based on the first synchronous control signal so as to control the charging process from the current source to the capacitor via the resistor, and the rising edge trigger generates a rising edge triggering signal based on the first synchronous control signal, the second switch performs switching based on the rising edge triggering signal so as to discharge the capacitor, and the comparator compares the voltage in the capacitor with a third reference voltage so as to generate the reference time signal.

11. A forward synchronous rectifier circuit, which includes:
 a converting unit, having a primary side and a second side, wherein the primary side is coupled with an input voltage, so as to convert the power from the input voltage source to an output voltage on the secondary side;
 a first switch, coupled with the primary side of the converting unit;
 a pulse width modulation controller, controlling the switching of the first switch based on a detecting signal of the output voltage;
 a synchronous rectifier switch unit, having a second switch and a third switch, in which the synchronous rectifier switch unit is coupled with the secondary side of the converting unit so as to rectify the output voltage; and
 a synchronous rectifier control device, coupled with the secondary side of the converting unit, and generating a first synchronous control signal and a second synchronous control signal based on the condition on the secondary side so as to respectively control the second switch and the third switch,
 wherein the synchronous rectifier controller stops generating the second synchronous control signal when the time period of the first synchronous control signal is shorter than a predetermined time period.

12. The forward synchronous rectifier circuit according to claim 11, wherein the predetermined time period can be adjusted based on a resistance value.

13. The forward synchronous rectifier circuit according to claim 11, wherein the predetermined time period can be adjusted based on a capacitance value.

14. The forward synchronous rectifier circuit according to claim 11, wherein a time lag exists between the third switch cutoff and the second switch conducting.

* * * * *